US006178734B1

(12) United States Patent
Shibuya et al.

(10) Patent No.: US 6,178,734 B1
(45) Date of Patent: Jan. 30, 2001

(54) COMBINED CYCLE POWER GENERATION PLANT AND OPERATING METHOD THEREOF

(75) Inventors: Sachio Shibuya, Tokyo; Yoichi Sugimori, Yokohama, both of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/139,893

(22) Filed: Aug. 25, 1998

(30) Foreign Application Priority Data

Aug. 26, 1997 (JP) .................................................... 9-229998

(51) Int. Cl.$^7$ ...................................................... F02C 6/18
(52) U.S. Cl. ................... 60/39.02; 60/39.141; 60/39.182
(58) Field of Search ............................. 60/39.02, 39.141, 60/39.182; 122/712

(56) References Cited

U.S. PATENT DOCUMENTS

| | | | |
|---|---|---|---|
| 5,042,246 | * 8/1991 | Moore et al. | 60/39.03 |
| 5,379,588 | * 1/1995 | Tomlinson et al. | 60/39.182 |
| 5,428,950 | * 7/1995 | Tomlinson et al. | 60/39.02 |
| 5,577,377 | * 11/1996 | Tomlinson | 60/39.02 |
| 5,979,156 | * 11/1999 | Uematsu et al. | 60/39.141 |

* cited by examiner

Primary Examiner—Charles G. Freay
(74) Attorney, Agent, or Firm—Oblon, Spivak, McClelland, Maier & Neustadt, P.C.

(57) ABSTRACT

A combined cycle power generation plant generally comprises a gas turbine plant, a steam turbine plant and an exhaust heat recovery boiler, which further includes a low temperature reheat steam system for supplying a turbine exhaust steam from a high pressure turbine of the steam turbine plant to a reheater of the exhaust heat recovery boiler, a cooling steam supply system which branches from the low temperature reheat steam system and supplies the turbine exhaust steam to the high temperature section as a cooling steam, an intermediate pressure superheater steam system which is connected to the cooling steam supply system and adapted to join a steam supplied from an intermediate pressure superheater of the exhaust heat recovery boiler together with the turbine exhaust steam, a reheat steam system connecting the reheater of the exhaust heat recovery boiler and the intermediate pressure turbine, a cooling steam recovery system which recovers a steam after cooling the gas turbine high temperature section to the reheat steam system, a bypass system which branches a superheat steam pipe connecting an outlet of a first high pressure superheater of the exhaust heat recovery boiler and an inlet of a second high pressure superheater thereof, and a main steam system which supplies a steam from the bypass system to the high pressure turbine.

7 Claims, 2 Drawing Sheets

COMBINED CYCLE POWER GENERATION PLANT AND OPERATING METHOD THEREOF

BACKGROUND OF THE INVENTION

The present invention relates to a combined cycle power generation plant, which cools a high temperature section of a gas turbine plant using a steam as a cooling medium and also relates to an operating method thereof.

In a recent thermal power generation plant, in order to improve a plant heat (thermal) efficiency, many combined cycle power generation plants, each of which is composed of a gas turbine plant, a steam turbine plant and an exhaust heat recovery boiler, are operated as a practical equipment (practically usable plant). In the combined cycle power generation plant, there are provided a so-called single-shaft type plant and a so-called multi-shaft type plant.

The single-shaft type plant is constructed in a manner that one steam turbine is directly connected to one gas turbine through a shaft, and a plurality of shaft systems are provided so as to meet a planned plant power output. On the other hand, the multi-shaft type plant is constructed in a manner that a plurality of shafts of the gas turbines are independently and separately provided with respect to one steam turbine.

The single-shaft type plant is constructed in a manner that one shaft system and the other shaft system do not interfere with each other, so that, in the case where the output power of the plurality of shaft systems is lowered during a partial load operation, the single-shaft type has an advantage of preventing a plant thermal (heat) efficiency from being rapidly lowered. On the other hand, the above multi-shaft type makes much of the steam turbine, and makes capacity (power output) large, so that the multi-shaft type has an advantage that the plant thermal efficiency during a rating operation becomes high by an increase of the capacity as compared with the single-shaft type.

As described above, since both single-shaft type and multi-shaft type have advantages, both types are operated as a practical equipment.

In both the single-shaft type and multi-shaft type combined cycle power generation plants, in order to economize fuel consumption and to reduce a unit price of power generation, it has been studied and developed to further improve plant thermal efficiency. The plant thermal efficiency is calculated from a ratio of the total sum of heat output of plants such as a gas turbine plant, a steam turbine plant and an exhaust heat recovery boiler to the total sum of heat input thereof. When reviewing the steam turbine plant, the gas turbine plant and the exhaust heat recovery boiler in an attempt to improve the plant thermal efficiency, it can be presumed the the steam turbine plant and the exhaust heat recovery boiler have already reached their efficiency limits. However, it is expected that an improvement in the thermal efficiency of the gas turbine will result in the improvement of a plant thermal efficiency of the entire combined cycle power generation plant.

In the gas turbine plant, the higher an inlet combustion gas temperature of the gas turbine is, the more the thermal efficiency can be improved. Further, through recent development, in heat resistant material and progress in cooling techniques the inlet combustion gas temperature of the gas turbine is increased to 1500° C. or more instead of 1000° C. to 1300° C.

In the case where the inlet combustion gas temperature of the gas turbine is 1500° C. or more, although heat resistant material has been developed, a high temperature section of the gas turbine, for example, a gas turbine stationary blade, a gas turbine moving blade, a liner transition piece of a combustor and the like, has already reached its maximum allowable metal temperature. For this reason, during an operation having many start-up and stopping times and a continuous operation of the plant for a long time, there is a high probability that accidents resulting from material breakage and fusion can happen. Thus, in the case of increasing the inlet combustion gas temperature of the gas turbine, in order to maintain the gas temperature within the allowable metal temperature of components of the high temperature section of the gas turbine, there has been developed a technique of cooling the high temperature section of the gas turbine using an air, and the practical equipment has been already realized.

However, in the case of cooling the high temperature section of the gas turbine using an air, an air compressor connected directly to the gas turbine is used as an air supply source. High pressure air supplied from the air compressor to the gas turbine are used for cooling the high temperature section of the gas turbine. Further, after the high pressure air is used to cool a turbine blade it is discharged as a gas turbine driving gas and, for this reason, the temperature of the gas turbine driving gas lowers, and a mixing loss is caused. This is a factor hindering the improvement of the plant thermal efficiency.

Recently, steam has been reconsidered as a cooling medium for cooling the high temperature section of the gas turbine, for example, the gas turbine stationary blade, a gas turbine moving blade, etc. The technique of using the steam as a cooling medium has been disclosed in a journal of Machinery Society of America (ASME thesis, 92-GT-240) and Japanese Patent Laid-Open Publication No. HEI 5-163961.

The steam has a specific heat valve twice as high as air, and is excellent in heat conductive performance. Further, in the steam, close loop cooling will possibly be adopted without lowering the temperature of the gas turbine driving gas and causing a mixing loss. Thus, it is expected that the steam is applied to a practical equipment in order to contribute to the improvement of plant efficiency.

However, in the case of using steam as a cooling medium for cooling the high temperature section of the gas turbine, there are several problems because the combined cycle power generation plant is a multi-shaft type.

In general, in the case of cooling the high temperature section of the gas turbine with steam, a driving steam of the steam turbine plant has been used.

However, in the multi-shaft type combined cycle power generation plant, a plurality of gas turbine plants are combined with respect to one steam turbine plant. For example, during a partial load operation, when only one of the plurality of gas turbine plants is operated, conditions (temperature, pressure, flow rate) of the steam supplied from the exhaust heat recovery boiler to the steam turbine plant greatly vary from design values. If the high temperature section of the gas turbine is cooled under varied steam conditions, the following problem and disadvantage will be caused.

For example, in the case where the temperature of the steam for cooling the high temperature section of the gas turbine is high, it is difficult to maintain a material strength of the gas turbine moving and stationary blades, a gas turbine rotor or the like and, for this reason, the use of the high temperature steam will be a factor of causing breakage and fusion. On the other hand, in the case where the aforesaid temperature of steam is low, an excessive thermal stress, due to the difference in temperatures between the gas turbine driving gas and a cooling steam, is locally generated in the gas turbine moving and stationary blades, a gas turbine rotor or the like. In the case where the steam temperature is further lower the steam is easy to drain, and a local thermal stress, resulting from excessive cooling, will be generated.

On the other hand, in the case where the pressure of the steam is high, the gas turbine moving and stationary blades are formed to have a thin thickness and, for this reason, there is a possibility that breakage will be caused due to a so-called ballooning (expansion by internal pressure). Further, in the case where the pressure of the steam is low, there is a possibility that the gas turbine driving gas flows into the moving and stationary blades.

Moreover, in the case where the flow rate of steam decreases, the gas turbine rotating and stationary blades, a gas turbine rotor and the like can not perform preferable cooling function and, for this reason, it is impossible to maintain their material strength. Therefore, it is difficult to cope with a high temperature gas turbine plant.

Furthermore, in the case where the temperature and pressure of steam are high, water is used with temperature and pressure reducing devices so that the temperature and pressure of the steam can be adjusted so as to provide a proper temperature and pressure. In this case, if the water is not sufficiently purified, dust gathers in a passage of the gas turbine moving and stationary blades and, for this reason, the passage is jammed with dust. As a result, the cooling performance lowers, which will constitute a factor of oxidation and corrosion.

As described above, in the multi-shaft type combined cycle power generation plant, in the case of cooling the high temperature section of the gas turbine using steam, there exists a close relationship between a fluctuation of conditions of the cooling steam supplied to the high temperature section of the gas turbine from the steam turbine plant and an increase and decrease in the number of operating gas turbine plants. For this reason, no fluctuation needs to be caused in the steam conditions. In particular, during a start-up operation and a partial load operation, it is difficult to adjust the steam conditions of the cooling steam supplied to the high temperature section of the gas turbine within a design value because a study and development of such adjustment has still not been sufficiently made.

SUMMARY OF THE INVENTION

An object of the present invention is to substantially eliminate defects or drawbacks encountered in the prior art mentioned above and to provide a combined cycle power generation plant and a method of operating the same capable of supplying a cooling steam having proper temperature and pressure to a high temperature section of a gas turbine even if there is a fluctuation in the number of operating gas turbine plants and capable of effectively recovering the steam after cooling to a steam turbine plant so as to restrict an output fluctuation of the steam turbine plant.

This and other objects can be achieved according to the present invention by providing, in one aspect, a combined cycle power generation plant which comprises a gas turbine plant including a high temperature section, a steam turbine plant including high, intermediate and low pressure turbines connected through a common shaft, and an exhaust heat recovery boiler including a reheater, and high, intermediate and low pressure superheaters, the combined cycle power generation plant further comprising:

a low temperature reheat steam system for supplying a turbine exhaust steam from the high pressure turbine of the steam turbine plant to the reheater of the exhaust heat recovery boiler;

a cooling steam supply system which branches from the low temperature reheat steam system and supplies the turbine exhaust steam to the high temperature section of the gas turbine plant as a cooling steam;

an intermediate pressure superheater steam system which is connected to the cooling steam supply system and adapted to join a steam supplied from the intermediate pressure superheater of the exhaust heat recovery boiler together with the turbine exhaust steam;

a reheat steam system connecting the reheater of the exhaust heat recovery boiler and the intermediate pressure turbine of the steam turbine plant;

a cooling steam recovery system which recovers a steam after cooling the gas turbine high temperature section to the reheat steam system;

a bypass system which branches a superheat steam pipe connecting an outlet of a first high pressure superheater of the exhaust heat recovery boiler and an inlet of a second high pressure superheater thereof; and a main steam system which supplies a steam from the bypass system to the high pressure turbine of the steam turbine plant.

In preferred embodiments, the low temperature reheat steam system includes a low temperature reheat flow control valve for controlling a flow rate of a turbine exhaust steam supplied from the high pressure turbine to the reheater. The bypass system includes a flow control valve for controlling a flow rate of a turbine exhaust steam.

One gas turbine plant is connected to one exhaust heat recovery boiler as one set and a plurality of the sets are disposed and the steam turbine plant has a multi-shaft structure which is separated from a shaft of the gas turbine plant of each of the sets as a single steam turbine plant located independently from the sets.

In a modification, the gas turbine plant may have a single-shaft structure which is directly connected to the shaft of said steam turbine plant.

In another aspect, there is provided a method of operating a combined cycle power generation plant which comprises a gas turbine plant including a high temperature section, a steam turbine plant including high, intermediate and low pressure turbines connected through a common shaft, and an exhaust heat recovery boiler including a reheater, and high, intermediate an low pressure superheaters and in which a turbine exhaust steam of the steam turbine plant is supplied to the high temperature section of the gas turbine plant and the turbine exhaust steam is recovered to the steam turbine plant after cooling the high temperature section of the gas turbine plant, the method comprising the steps of:

supplying a steam from the exhaust heat recovery boiler to the high pressure turbine of the steam turbine plant during a start-up operation or a partial load operation;

carrying out a constant pressure operation in the high pressure turbine while carrying out an inlet pressure control in a reheat steam system for connecting the reheater of the exhaust heat recovery boiler to the intermediate pressure turbine of the steam turbine plant;

joining the turbine exhaust steam after being expanded in the high pressure turbine together with a steam generated from an intermediate pressure drum of the exhaust heat recovery boiler;

supplying the joined steam to the high temperature section of the gas turbine plant so as to cool the high temperature section; and joining the jointed steam, after cooling, together with a reheated steam from the reheater and recovering the joined steam to the intermediate pressure turbine.

In a preferred embodiment of this aspect, a plurality of gas turbine plants are located and the partial load operation is an operation at a time when the number of the gas turbine plants in a condition of being operated is reduced.

The start-up operation is performed in either one of cases where an air temperature becomes higher than a predetermined temperature and where temperature and pressure of a steam from the high pressure turbine to be supplied to the gas turbine are out of a predetermined range. A constant pressure operation of the high pressure turbine is carried out by throttling down a valve opening of either one of a main steam stop valve and a steam control valve located on a main steam system mutually connecting the exhaust heat recovery boiler and the high pressure turbine.

There is generated a valve signal for throttling down a valve opening of either one of a steam stop valve and a steam control valve, the valve signal being represented by a temperature of either one of a cooling steam supply system and a cooling steam recovery system located to the gas turbine high temperature section.

An inlet pressure control of a reheat steam system is carried out by throttling down a valve opening of a reheat steam combination valve located to the reheat steam system, and a valve signal for throttling down the reheat steam combination valve is represented by a pressure of either one of a cooling steam supply system and a cooling steam recovery system located to the gas turbine high temperature section.

According to the present invention of the characters mentioned above, when supplying the turbine exhaust steam of the high pressure turbine to the high temperature section of the gas turbine as a cooling steam, in the case where the turbine exhaust steam diverges from a proper temperature and pressure operating range, the inlet pressure control (IPC) is carried out in the reheat steam system of the intermediate pressure turbine so as to make high the pressure of intermediate pressure superheated steam generated from the intermediate pressure drum. The intermediate pressure superheated steam is joined together with the turbine exhaust steam, and then, is controlled so as to become a proper pressure, and further, the superheated steam generated from the first high pressure superheater of the exhaust heat recovery boiler is supplied as a low temperature steam to the high pressure turbine with the use of the bypass system. At this time, a constant pressure operation is carried out in the high pressure turbine, and the turbine exhaust steam is controlled so as to become a proper temperature. Therefore, the high temperature section of the gas turbine can be securely cooled, and it is possible to sufficiently cope with the gas turbine which is made high temperature.

Further, in the combined cycle power generation plant according to the present invention, and in the operating method thereof, the steam after cooling the high temperature section of the gas turbine is joined together with the reheat steam supplied from the reheater of the exhaust heat recovery boiler, and then, is recovered into the intermediate pressure turbine. Thus, an output power of the steam turbine plant can be increased, and also, the plant thermal efficiency can be improved.

The nature and further characteristic features of the present invention will be made more clear from the following descriptions made with reference to the accompanying drawings.

DESCRIPTION OF THE PREFERRED EMBODIMENTS

A combined cycle power generation plant and an operating method thereof according to preferred embodiments of the present invention will be described hereunder with reference to the accompanying drawings. Prior to a description on the operating method of the combined cycle power generation plant of the present invention, the construction thereof will be first described hereunder.

Figure 1:
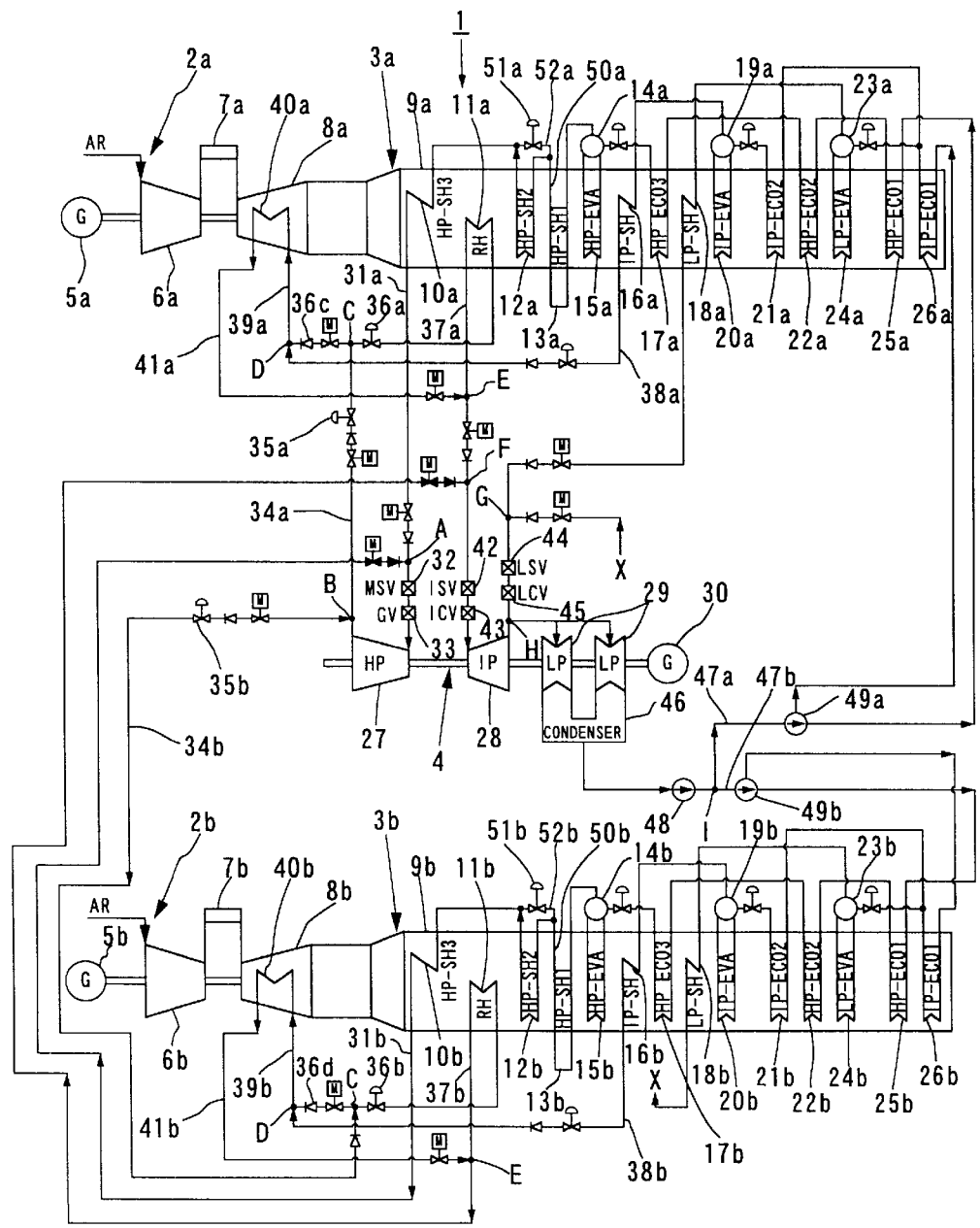
FIG. 1 is a schematic system diagram showing an example of a combined cycle power generation plant according to a first embodiment of the present invention, which is applied to a multi-shaft type structure.

FIG. 1 is a schematic system diagram showing an example of a combined cycle power generation plant according to a first embodiment of the present invention, which is applied to a multi-shaft type. The combined cycle power generation plant of this first embodiment is constructed in a manner of combining one steam turbine plant, two gas turbine plants and two exhaust gas recovery boilers.

A combined cycle power generation plant 1 includes a first exhaust heat recovery boiler 3a connected to a first gas turbine plant 2a, an independently provided steam turbine plant 4 which is separated in shaft, and a second exhaust heat recovery boiler 3b connected to an independently provided second gas turbine plant 2b which is separated from the shaft of the steam turbine plant 4. The first gas turbine plant 2a includes a generator 5a, an air compressor 6a, a gas turbine combustor 7a, and a gas turbine 8a.

In the first gas turbine plant 2a, an air AR sucked by the air compressor 6a is made high pressure, and then, the air is guided to the gas turbine combustor 7a. Further, in the gas turbine plant 2a, a fuel is added to the high pressure air so as to generate a combustion gas, and then, the generated combustion gas is guided to the gas turbine 8a so as to be expanded. The generator 5a is driven by a rotating torque generated at this time, and the exhaust gas from the generator 5a is supplied to the first exhaust heat recovery boiler 3a as a steam generating source.

Incidentally, the second gas turbine plant 2b has the same components as those of the first gas turbine plant 2a and, hence, an additional character "b" in place of "a" is given to the component numbers, and the overlapping explanation is omitted.

The first exhaust heat recovery boiler 3a has a casing 9a extending along an axial direction thereof.

Further, the first exhaust heat recovery boiler 3a includes the following components successively along a flowing direction of an exhaust gas flowing through the casing 9a. That is, a third high pressure superheater 10a, a reheater 11a, a second high pressure superheater 12a, a first high pressure superheater 13a, a high pressure evaporator 15a communicating with a high pressure drum 14a, an intermediate pressure superheater 16a, a third high pressure economizer 17a, a low pressure superheater 18a, an intermediate pressure evaporator 20a communicating with an intermediate pressure drum 19a, a second intermediate pressure economizer 21a, a first high pressure economizer 22a, a low pressure evaporator 24a communicating with a low pressure drum 23a, a first high pressure economizer 25a and a first intermediate pressure economizer 26a. A saturated steam vaporized by these high, intermediate and low pressure evaporators 15a, 20a and 24a are separated into gas and liquid by means of high, intermediate and low steam drums 14a, 19a and 23a.

Incidentally, the second exhaust heat recovery boiler 3b has the same components as the first exhaust heat recovery boiler 3a and, therefore, an additional character "b" is given in place of "a" to the component numbers, and the overlapping explanation is omitted.

On the other hand, the steam turbine plant 4 is constructed in a manner that a high pressure turbine 27, an intermediate pressure turbine 28, a low pressure turbine 29 and a generator 30 are mutually connected by means of a common shaft. Superheated vapors generated from the third high pressure superheater 10a of the first exhaust heat recovery boiler 3a and the third high pressure superheater 10b of the second exhaust recovery boiler 3b, join together with each other at a joining point A of a first main steam system 31a and a second main steam system 31b. The joined steam is then supplied to the high pressure turbine 27 via a main steam stop valve 32 and a control valve 33.

In the high pressure turbine 27, the joined steam is expanded, and thereafter, branches at a branching point B as a turbine exhaust gas. The branching steam is then supplied to a branching point C via a first high pressure exhaust distributing valve 35a of a first low temperature reheated steam system 34a and a second high pressure exhaust distributing valve 35b of a first low temperature reheated steam system 34b.

A part of the turbine exhaust steam supplied to the branching point C is controlled to a proper flow rate by means of a low temperature reheat flow control valve 36a, and thereafter, is supplied to the reheater 11a of the first exhaust heat recovery boiler 3a, and then, after being heated therein, is supplied to a reheat steam system 37a as a reheat steam. On the other hand, the remainder of the turbine exhaust steam is joined at a joining point D via a low temperature reheat check valve 36c together with an intermediate pressure superheated steam of the whole flow rate supplied from the intermediate pressure drum 19a of the first exhaust heat recovery boiler 3a via the intermediate pressure superheater 16a and an intermediate pressure steam system 38a. The joined steam is then supplied as a cooling steam to a high temperature section 40 of the gas turbine 8a via a cooling steam supply system 39a.

The gas turbine 8a is constructed in a manner that a cooling steam after cooling the high temperature section 40a of the gas turbine 8a joins together with a reheat steam at a joining point E of a reheat steam system 37a as a recovery steam via a cooling steam recovering system 41a.

In the reheat steam system 37a, the reheat steam from the reheater 11a and the recovery steam from the cooling steam recovering system 41 joins together at the joining point E, and then, the joined steam again joins together with a reheat steam from the reheater 11b of the second exhaust heat recovery boiler 3b, and hence, is supplied to the intermediate pressure turbine 28 via a reheat steam combination valve 42 and an intercept valve 43.

The intermediate pressure turbine 28 supplies the joined steam to the low pressure turbine 29 as a turbine exhaust steam after the jointed steam performs expansion work. Further, the intermediate pressure turbine 28 joins low pressure superheated steams supplied from the low pressure superheater 18a of the first exhaust heat recovery boiler 3a and the low pressure superheater 18b of the second exhaust heat recovery boiler 3b together at a joining point G. Further, the joined low pressure superheated steam again joins together with the aforesaid turbine exhaust steam at a joining point H via a low pressure steam combination valve 44 and a low pressure control valve 45, and then, is supplied to the low pressure turbine 29. Incidentally, a flow of each steam of the second exhaust heat recovery boiler 3b is the same as that of the aforesaid first exhaust heat recovery boiler 3a and, therefore, the explanation is omitted.

In the low pressure turbine 29, the joined steam performs expansion work, and by a rotating torque generated at this time, the generator 30 is driven. Further, the jointed steam after performing the expansion work is supplied to a condenser 46 as a turbine exhaust steam.

The condenser 46 is provided with a first condensate/feed-water system 47a and a second condensate/feed-water system 47b.

In the first condensate/feed-water system 47a, the turbine exhaust steam from the low pressure turbine 29 is condensed into a condensate by means of the condenser 46, and then, a pressure of the condensate is made high by means of a condenser pump 48 so that the condensate branches at a branching point I. Thereafter, a part of the condensate is supplied to a first feed water pump 49a as a feed water. In the first feed water pump 49a, a part of feed water is extracted in an intermediate stage, what is called, intermediate stage extraction is performed, and then, the extracted water is supplied to the first intermediate pressure economizer 26a of the first exhaust heat recovery boiler 3a. On the other hand, the remainder of the feed water is supplied to the first high pressure economizer 25a of the first exhaust heat recovery boiler 3a. Incidentally, the second condensate/feed-water system 47b has the same construction as the first condensate/feed-water system 47a and, therefore, an additional character "b" in place of "a" is given to the component numbers, and the overlapping explanation is omitted.

In the first exhaust heat recovery boiler 3a, a feed water supplied to each of the first intermediate pressure economizer 26a and the first high pressure economizer 25a from the first condensate/feed-water supply system 47a, performs a heat exchange with an exhaust gas from the first gas turbine plant 2a, and then, is separated into a gas and liquid by means of low, intermediate and high pressure steam drums 23a, 19a and 14a. Thereafter, the superheated vapor (steam) is supplied as a driving steam for the steam turbine plant 4 and as a cooling steam for the high temperature section 40 of the gas turbine 18a. In this case, in the first exhaust heat recovery boiler 3a, the midway of a superheat steam pipe 50a connected to an inlet of the second high pressure superheater 12a branches from an outlet of the first high pressure superheater 13a, and a bypass system 52a including a flow control valve 51a is connected to an outlet of the second high pressure superheater 12a. In the case where a superheated steam generated from the second high pressure superheater 12a has temperature and pressure exceeding design values, a flow rate is controlled by means of the flow control valve 51 so that the superheated steam has a proper temperature and pressure. Then, the superheated steam having the proper temperature and pressure is supplied to the high pressure turbine 27 via the third high pressure superheater 10a and the first main steam system 31a. Further, the bypass system 52a is provided on the outlet side of the second high pressure superheater 12a by taking into consideration the following problem. That is, in the case where the superheated steam generated from the second high pressure superheater 12a is high, for example, it is supposed that a feed water from the first condensate/feed-water system 47a is used to control the superheated steam so that the steam has a proper temperature and pressure. However, the superheated steam thus controlled is used as a driving steam for the high pressure turbine 27, and thereafter, is used as a cooling steam for the high temperature section 40a of the gas turbine 8a. Considering the above usage of the superheated steam, if the purification of the aforesaid feed water is insufficient, there is the possibility that the dust gathers on the high temperature section 40a of the gas turbine 8a and, as a result, the gas turbine 8a is jammed with the dust.

Next, an operating method of the combined cycle power generation plant of the structure mentioned above will be described hereunder when cooling the high temperature section 40a of the gas turbine 8a using a steam and recovering the cooling steam during a start-up operation or partial load operation.

The multi-shaft type combined cycle power generation plant 1 is constructed in a manner that a plurality of gas turbine plants 2a and 2b are combined with respect to one steam turbine plant 4. Thus, when the number of operating gas turbine plants 2a and 2b reduces, the driving steam or flow rate of the high pressure turbine 27 decreases, and the pressure varies. Accordingly, the pressure of the cooling steam as the turbine exhaust inevitably varies.

For example, during a start-up operation or partial load operation, in the case of operating one of the first gas turbine plant 2a and the second gas turbine plant 2b (hereinafter, referred to as one-plant operation), in the high pressure turbine 27, the flow rate of the cooling steam to be supplied to the high temperature section 40a of the gas turbine 8a become half as compared with the case of operating two plants, and also, the pressure thereof becomes a half of a design pressure, e.g., 3.63 MPa, that is, 1.8 MPa. For this reason, in the high pressure turbine 27, in the case of supplying the turbine exhaust steam to the high temperature section 40a of the gas turbine 8a as a cooling steam, the flow of cooling steam becomes worse taking into consideration a pressure loss of the high temperature section 40a of the gas turbine 8a, and as a result, it is difficult to cool the high temperature section 40a of the gas turbine 8a. Further, in the high pressure turbine 27, if the flow rate of cooling steam is reduced by half, the temperature of turbine exhaust steam becomes high, and the temperature of the cooling steam required for cooling the high temperature section 40a of the gas turbine 8a exceeds the allowable value. For this reason, it is impossible to cool the high temperature section 40a of the gas turbine 8a.

As described above, when any one of the first gas turbine plant 2a and the second gas turbine plant 2b is operated, it is impossible to cool the high temperature section 40a of the gas turbine 8a, for example. In order to supply a cooling steam having a proper temperature and pressure to the high temperature section 40a of the gas turbine 8a, there are required an operation for making "thigh" a turbine exhaust steam pressure of the high pressure turbine 27 and an operation for making "low" a turbine exhaust steam temperature thereof. Of course, the turbine exhaust steam pressure "high" and the turbine exhaust steam temperature "low" have a mutually contrary relation in the light of thermodynamics. For this reason, these technical matters must be considered independently from each other. Therefore, the following operating methods are required.

(1) Operating method for making "high" turbine exhaust steam pressure of the high pressure turbine:

In the case of one-plant operation, the following manner is made in this embodiment. More specifically, the turbine exhaust steam supplied to the high temperature section 40a of the gas turbine 8a from the high pressure turbine 27 through the first low temperature reheat steam system 34a, joins at a joining point D together with the superheated steam supplied from the intermediate pressure drum 19a of the first exhaust heat recovery boiler 3a via the intermediate pressure superheater 16a and the intermediate superheated steam system 38a, and then, the joined steam is supplied to the high temperature section 40a of the gas turbine 8a via the cooling steam supply system 39a. After cooling the high temperature section 40a of the gas turbine 8a, the recovery steam joins at the joining point E together with a reheat steam from the reheat steam system 37a via the cooling steam recovery system 41a, and then, the joined steam is recovered into the intermediate pressure turbine 28 via the reheat steam combination valve 42 and the intercept valve 43. Therefore, the pressure of the intermediate pressure superheated steam, flowing through the intermediate pressure superheat steam system 38a, the high temperature section 40a and the cooling steam recovery system 41a, is determined depending upon the pressure of the joined steam on the inlet side of the reheat steam combination valve 42 of the reheat steam system 37a. In other words, by adjusting (controlling) a valve opening of the reheat steam combination valve 42, the steam pressure of the intermediate pressure superheat steam system 38a, the cooling system supply system 39a, the high temperature section 40a and the cooling steam recovery system 41a varies.

In this embodiment, taking the above-mentioned technical matter into consideration, during the one-plant operation, by throttling down the valve opening of the reheat steam combination valve 42, the pressure of intermediate superheated steam from the intermediate pressure superheat steam system 38a, the cooling steam supply system 39a and the high temperature section 40a, is made "high" so as to become a proper pressure, and then, the intermediate superheated steam is supplied to the high temperature section 40a of the gas turbine 8a. In this case, the valve opening of the reheat steam combination valve 42 is set on the basis of a detection pressure signal from a pressure detector, not shown, which is provided in either one of the cooling steam supply system 39a and the cooling steam recovery system 41a.

As can be understood from the above description, in this embodiment, in the case where the turbine exhaust steam, which is supplied to the high temperature section 40a of the gas turbine 8a from the high pressure turbine 27 via the first low temperature reheat steam system 34a and the cooling steam supply system 39a, is short of pressure, the valve opening of the reheat steam combination valve 42 is throttled down so as to make "high" the pressure of the intermediate pressure superheated steam of the intermediate pressure superheat steam system 38a, the cooling steam supply system 39a, the high temperature section 40a and the cooling steam recovery system 41a. Thus, the turbine exhaust steam can securely cool the high temperature section 40a of the gas turbine 8a as a cooling steam having a proper pressure.

Further, in this embodiment, the steam after cooling the high temperature section 40a of the gas turbine 8a is recovered into the intermediate pressure turbine 28, so that an output fluctuation of the steam turbine plant 4 can be restricted lower.

(2) Operating method for making "low" turbine exhaust steam temperature of the high pressure turbine:

Usually, the temperature of the turbine exhaust steam of the high pressure turbine 27 is made high during the one-plant operation. Moreover, the temperature of the turbine exhaust steam of the high pressure turbine 27 is made further high when carrying out a so-called Inlet Pressure Control (IPC) for making "high" the pressure of the reheat steam system 37a by throttling down the valve opening of the reheat steam combination valve 42. For this reason, in order to carry out an operation for making "low" the turbine exhaust steam temperature of the high pressure turbine 27, there is required a constant pressure operation for making "low" the temperature of a main steam (superheated vapor) supplied to the high pressure turbine 27 from the first high pressure superheater 13a of the first exhaust heat recovery boiler 3a via the second high pressure superheater 12a, the third high pressure superheater 10a and the first main steam system 31a, and for making "low" the turbine exhaust steam temperature by throttling down the main steam stop valve 32 of the first steam system 31a or the steam control valve 33 while improving the turbine efficiency.

According to the operating method of this embodiment, first, the flow control valve 51a of the bypass system 52a branching from the superheat steam pipe 50a connecting the outlet of the first high pressure superheater 13a and the inlet of the second high pressure superheater 12a, is opened. When opening the flow control valve 51a, it is possible to lower the temperature of the main steam supplied to the high pressure turbine 27 from the first high pressure superheater 13a via the third high pressure superheater 10a and the main steam system 31a because the second high pressure superheater 12a is bypassed.

Even though the temperature of the main steam is lowered, the turbine exhaust steam, which is supplied as a cooling steam from the high pressure turbine 27 to the high temperature section 40a of the gas turbine 8a, is limited to the upper limit value of a proper temperature range. For this reason, in order to carry out a further stable operation by widening an operating range of the high pressure turbine 27, a constant pressure operation is carried out according to the aforesaid IPC of the first main steam system 31a. In the high pressure turbine 27, when throttling down the valve opening by the main steam stop valve 32 of the first main steam system 31a or the steam control valve 33 and the constant pressure operation is carried out, the main steam temperature becomes slightly high. Thus, the main steam performs further expansion work, so that the turbine efficiency can be improved. As a result, it is possible to further make low the turbine exhaust steam temperature and to securely carry out a stable operation. In this case, the valve opening of the main steam stop valve 32 or the steam control valve 33 is set on the basis of a detection pressure signal from a pressure detector, not shown, which is provided in either one of the cooling steam supply system 39a and the cooling steam recovery system 41a.

As described above, in this first embodiment, the main steam temperature is lowered with the use of the bypass system 52a provided on the first high pressure superheater 13a, and the valve opening of the main steam stop valve 32 or the steam control valve 33 is throttled down so that the high pressure turbine 27 makes a constant pressure operation, and further, the turbine exhaust steam temperature is securely lowered to a proper temperature required for the high temperature section 40a of the gas turbine 8a. Therefore, it is possible to securely cool the high temperature section 40a of the gas turbine 8a.

It is of course to be noted that although the above first embodiment is one example using two plants, the present embodiment is also applicable to the case where the number of operating plants is reduced in a plurality of, that is, three or more plants.

Figure 2:
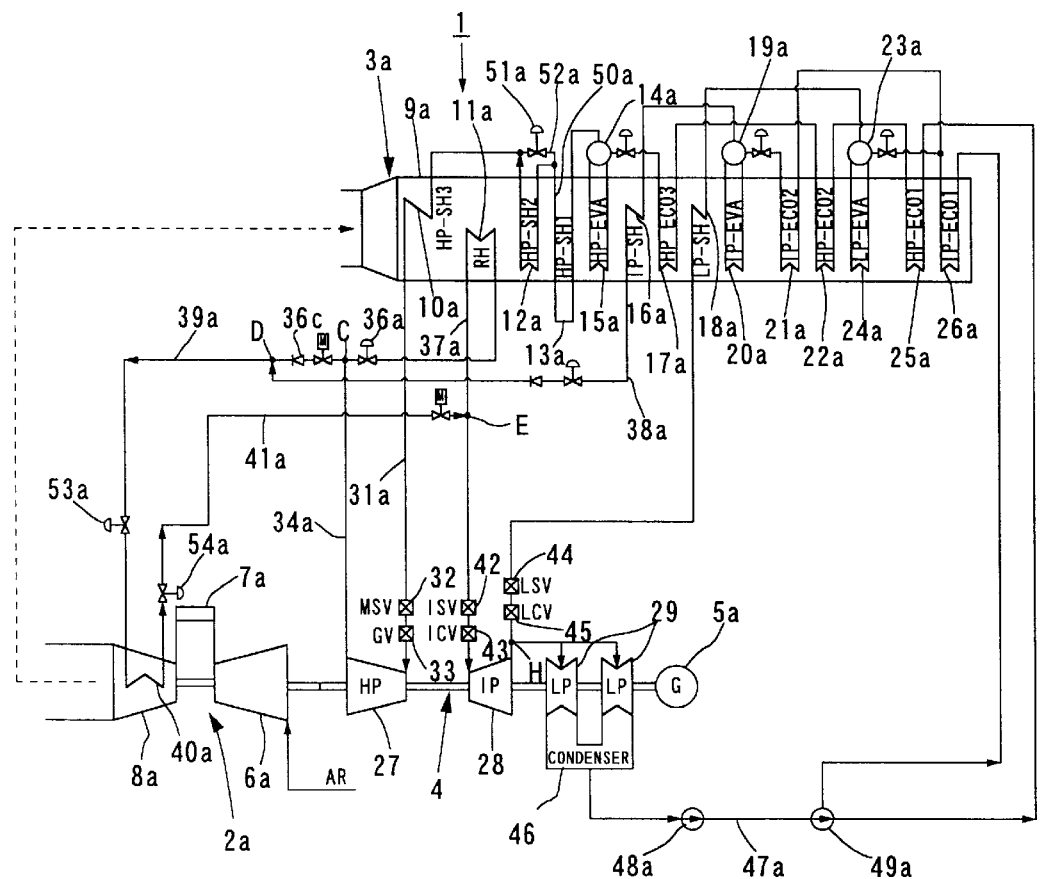
FIG. 2 is a schematic system diagram showing an example of a combined cycle power generation plant according to a second embodiment of the present invention, which is applied to a single-shaft type structure.

FIG. 2 is a schematic system diagram showing an example of a combined cycle power generation plant according to a second embodiment of the present invention, which is applied to a single-shaft type, in which like reference numerals are added to members or elements corresponding to those used in the first embodiment.

In general, the single-shaft type combined cycle power generation plant is constructed in a manner that one steam turbine plant and one exhaust heat recovery boiler are paired, and the paired structure is combined with one gas turbine plant. Thus, there is a dependent relationship between a fluctuation of the exhaust gas supplied to the exhaust heat recovery boiler from the gas turbine plant and a fluctuation of the steam flow supplied to the exhaust heat recovery boiler from the gas turbine plant. Therefore, the single-shaft type has no need of making complicate the steam flow control as compared with the multi-shaft type.

However, under high air temperature such as in a summer season, the gas turbine plant does not give an output power as a design value from its character, nevertheless, the exhaust gas temperature becomes high. For this reason, the temperature of the main steam supplied to the gas turbine plant from the exhaust heat recovery boiler becomes high, and also, the temperature and pressure of the turbine exhaust steam supplied as a cooling steam to the high temperature section of the gas turbine from the steam turbine plant exceed a proper temperature operating range. In particular, in the summer season, the aforesaid tendency appears remarkably when the gas turbine plant makes a partial load operation.

In order to solve the problem caused in the case where the air temperature reaches a predetermined temperature in the summer season, in this second embodiment, the following manner is made like the first embodiment. That is, the bypass system 52a including the flow control valve 51a is provided on the superheat steam pipe 50a connecting the outlet of the first high pressure superheater 13a of the first exhaust heat recovery boiler 3a and the inlet of the second high pressure superheater 12a, and a superheated steam generated from the first high pressure superheater 13a is supplied as a relatively low temperature main steam to the high pressure turbine 27 via the bypass system 52a, the third high pressure superheater 10a and the main steam system 31a. Subsequently, the turbine exhaust steam after expansion branches at the branching point C via the first low temperature reheat steam system 34a, and a part of the branching turbine exhaust steam is controlled to a proper flow rate by means of the low temperature reheat flow control valve 36a, and then, is supplied to the reheater 11a. On the other hand, the remainder of the branching turbine exhaust steam is supplied to the high temperature section 40a of the gas turbine 8a via the cooling steam supply system 39 including a low temperature reheat flow control valve 36c and the flow control valve 53a. After the cooling thereof, the recovery cooling steam joins at the joining point E of the reheat steam system 37a together with a reheat steam from the reheater 11a via the cooling steam recovery system 41a including a flow control valve 54a, and then, the joined steam is recovered into the intermediate pressure turbine 28 via the reheat steam combination valve 42 and the intercept valve 43. In the case where the turbine exhaust steam of the high pressure turbine 27 diverges from a predetermined operating range of a proper temperature and pressure cooling steam to be supplied to the high temperature section 40a of the gas turbine 8a, the valve opening of the main steam stop valve 32 of the first main steam system 39a or the steam control valve 33 thereof may be throttled down so that the high pressure turbine 27 makes a constant pressure operation. Further, the valve opening of the reheat steam combination valve 42 of the reheat steam system 37a is throttled down so as to make high the pressure of intermediate pressure superheated steam generated from the intermediate pressure drum 19a of the first exhaust heat recovery boiler 3a, and then, the intermediate pressure superheated steam may be joined at the joining point D together with the turbine exhaust steam from the high pressure turbine 27 via the intermediate pressure superheat steam system 38a.

As described above, in this second embodiment, in the case where the air temperature is high such as in the summer season and the main steam temperature supplied to the high pressure turbine 27 from the first exhaust heat recovery boiler 3a is high, the superheated steam generated from the first high pressure superheater 13a is made relatively low temperature with the use of the bypass system 52a of the first exhaust heat recovery boiler 3a, and then, is supplied to the high pressure turbine 27. Therefore, the temperature of the turbine exhaust steam after being expanded in the high pressure turbine 27 can be set within a proper temperature operating range required for cooling the high temperature section 40a of the gas turbine 8a.

Thus, in this second embodiment, the turbine exhaust steam of the high pressure turbine 27 is set within the proper temperature operating range, so that the high temperature section 40a of the gas turbine 8a can be securely cooled, and also, it is possible to cope with the gas turbine 8a which is made high temperature.

Further, in this second embodiment, the steam after cooled the high temperature section 40a of the gas turbine 8a is recovered into the intermediate pressure turbine 28, so that an output power of the steam turbine plant 4 can be increased, and the plant thermal efficiency can be improved.

It is to be noted that the present invention is not limited to the described embodiments and many other changes or modifications may be made without departing from the scopes of the appended claims.

What is claimed is:

1. A method of operating a combined cycle power generation plant which comprises a gas turbine plant including a high temperature section, a steam turbine plant including high, intermediate and low pressure turbines connected through a common shaft, and an exhaust heat recovery boiler including a reheater, and high, intermediate and low pressure superheaters and in which a turbine exhaust steam of the steam turbine plant is supplied to the high temperature section of the gas turbine plant and the turbine exhaust steam is recovered to the steam turbine plant after cooling the high temperature section of the gas turbine plant, said method comprising the steps of:

supplying a steam from the exhaust heat recovery boiler to the high pressure turbine of the steam turbine plant during a start-up operation or a partial load operation;

carrying out a constant pressure operation in the high pressure turbine while carrying out an inlet pressure control in a reheat steam system for connecting the reheater of the exhaust heat recovery boiler to the intermediate pressure turbine of the steam turbine plant;

joining the turbine exhaust steam after being expanded in the high pressure turbine together with a steam generated from an intermediate pressure drum of the exhaust heat recovery boiler;

supplying the joined steam to the high temperature section of the gas turbine plant so as to cool the high temperature section; and joining the joined steam, after cooling, together with a reheated steam from the reheater to form a secondary joined steam and supplying the secondary joined steam to the intermediate pressure turbine.

2. A method of operating a combined cycle power generation plant according to claim 1, wherein the combined cycle power generation plant comprises a plurality of gas turbine plants are combined with the steam turbine plant and wherein the partial load operation is an operation at a time when a number of the gas turbine plants being operated is less than a total number of the gas turbine plants in the combined cycle power generation plant.

3. A method of operating a combined cycle power generation plant according to claim 1, wherein the start-up operation is performed in either one of cases where an ambient air temperature becomes higher than a predetermined temperature and where temperature and pressure of a steam from the high pressure turbine to be supplied to the gas turbine are out of a predetermined range.

4. A method of operating a combined cycle power generation plant according to claim 1, wherein a constant pressure operation of the high pressure turbine is carried out by throttling down a valve opening of either one of a main steam stop valve and a steam control valve located on a main steam system mutually connecting the exhaust heat recovery boiler and the high pressure turbine.

5. A method of operating a combined cycle power generation plant according to claim 1, wherein there is generated a valve signal for throttling down a valve opening of either one of a steam stop valve and a steam control valve, said valve signal being represented by a temperature of either one of a cooling steam supply system used for supplying the joined steam and a cooling steam recovery system used for supplying the secondary joined steam and connected to the gas turbine high temperature section.

6. A method of operating a combined cycle power generation plant according to claim 1, wherein said inlet pressure control of a reheat steam system is carried out by throttling down a valve opening of a reheat steam combination valve connected to the reheat steam system.

7. A method of operating a combined cycle power generation plant according to claim 6, wherein a valve signal for throttling down the reheat steam combination valve represents a pressure of either one of a cooling steam supply and a cooling steam recovery system connected to the gas turbine high temperature section.

* * * * *